United States Patent
Metsärinta et al.

(10) Patent No.: US 10,501,824 B2
(45) Date of Patent: Dec. 10, 2019

(54) TREATMENT OF COMPLEX SULFIDE CONCENTRATE

(71) Applicant: OUTOTEC (FINLAND) OY, Espoo (FI)

(72) Inventors: Maija-Leena Metsärinta, Vanha-Ulvila (FI); Satu Jyrkönen, Vanha-Ulvila (FI); Jussi Liipo, Ulvila (FI)

(73) Assignee: OUTOTEC (FINLAND) OY, Espoo (FI)

(*) Notice: Subject to any disclaimer, the term of this patent is extended or adjusted under 35 U.S.C. 154(b) by 291 days.

(21) Appl. No.: 15/524,708

(22) PCT Filed: Nov. 10, 2015

(86) PCT No.: PCT/FI2015/050779
§ 371 (c)(1),
(2) Date: May 5, 2017

(87) PCT Pub. No.: WO2016/075368
PCT Pub. Date: May 19, 2016

(65) Prior Publication Data
US 2018/0298467 A1    Oct. 18, 2018

(30) Foreign Application Priority Data
Nov. 10, 2014 (FI) ................................. 20145980

(51) Int. Cl.
C22B 23/02    (2006.01)
C22B 15/00    (2006.01)
C22B 23/00    (2006.01)

(52) U.S. Cl.
CPC ........ *C22B 23/025* (2013.01); *C22B 15/0015* (2013.01); *C22B 15/0028* (2013.01); *C22B 23/005* (2013.01)

(58) Field of Classification Search
CPC .............. C22B 23/025; C22B 15/0015; C22B 15/0028; C22B 23/005
See application file for complete search history.

(56) References Cited

U.S. PATENT DOCUMENTS 4,069,041 A    1/1978    Gorling et al.
4,344,792 A    8/1982    O'Neill
(Continued)

FOREIGN PATENT DOCUMENTS

CA    2098521 A1    12/1993
CN    1730684 A    2/2006
(Continued)

OTHER PUBLICATIONS

"A Review of Nickel Pyrometallurgical Operations," Journal of Metals, Sep. 1988, 28-33. (Year: 1988).*
(Continued)

*Primary Examiner* — Anthony J Zimmer
(74) *Attorney, Agent, or Firm* — Robert P. Michal, Esq.; Carter, DeLuca & Farrell LLP

(57) ABSTRACT

A process of treating complex sulfide concentrate includes the steps of roasting wet or slurried complex sulfide concentrate in a furnace at a temperature of at least 720° C. to obtain a calcine; smelting the calcine under inert or oxygen free atmosphere in a smelting furnace to obtain a matte, and optionally granulating the matte to obtain a granulated matte.

11 Claims, 5 Drawing Sheets

(56) References Cited

U.S. PATENT DOCUMENTS

| | | | | |
|---|---|---|---|---|
| 5,182,014 A | * | 1/1993 | Goodman | B03D 1/02 204/277 |
| 5,332,414 A | * | 7/1994 | Makinen | C22B 23/005 75/10.1 |
| 2014/0026713 A1 | | 1/2014 | Bezuidenhout et al. | |

FOREIGN PATENT DOCUMENTS

| | | |
|---|---|---|
| CN | 102181662 A | 9/2011 |
| CN | 103572056 A | 2/2014 |
| EP | 0 052 595 A1 | 5/1982 |
| WO | WO-9006898 A1 | 6/1990 |

OTHER PUBLICATIONS

Frank K. Crundwell et al., Extractive Metallurgy of Nickel, Cobalt and Platinum-Group Metals, Elsevier, pp. 199-209, XP002753098 [X] 1-12 * (13 pages).

Written Opinion of the International Searching Authority issued by the European Patent Office acting as the International Searching Authority in relation to International Patent Application No. PCT/FI2015/050779 dated Jan. 29, 2016 (5 pages).

International Search Report issued by the European Patent Office acting as the International Searching Authority in relation to International Patent Application No. PCT/FI2015/050779 dated Jan. 29, 2016 (3 pages).

International Preliminary Report on Patentability issued by the European Patent Office acting as the International Preliminary Examining Authority in relation to International Patent Application No. PCT/FI2015/050779 dated Feb. 3, 2017 (6 pages).

Notification of the First Office Action issued by the State Intellectual Property Office of the People's Republic of China issued in relation to Chinese Application No. 201580063459.9 dated Apr. 27, 2018 (7 pages) along with English language translation (10 pages).

Finnish Office Action issued by the Finnish Patent and Registration Office in relation to Finnish Application No. 20145980 dated Sep. 24, 2018 (4 pages).

Marchenko N.V. Metallurgiya Tyazhelyh Tsvetnyh Metallov: Electron-noye uchebnoye posobiye—Krasnoyarsk IPK SFU, 2009, 6Mb (7 pages; cover page, copyright page; pp. 224, 234, 235, 241 and 242) (Extracts in English Language (3 pages) of pp. 224, 234, 235, 241 and 242).

Notification of the Necessity to Present Additional Material issued by the Eurasian Patent Organization in relation to Eurasian Application No. 201790901/28 (2 pages) and English language translation (3 pages).

* cited by examiner

TREATMENT OF COMPLEX SULFIDE CONCENTRATE

CROSS-REFERENCE TO RELATED APPLICATIONS

This application is a National Phase Entry under 35 USC § 371 of PCT Patent Application Serial No. PCT/FI2015/050779 filed Nov. 10, 2015, which claims priority to Finnish Patent Application No. 20145980, filed Nov. 10, 2014, the disclosure of each of these applications is expressly incorporated herein by reference in their entirety.

FIELD OF THE INVENTION

The present invention relates to treatment of ore concentrate for leaching, and more particularly to a process of treating complex sulfide concentrate comprising Ni, Cu, Co, Fe and/or PGM.

BACKGROUND OF THE INVENTION

CA2098521 discloses a method for producing a high-grade nickel matte and a highly oxidized slag in a flash smelting furnace, and for reducing the slag from the flash smelting furnace and for sulfidizing the resulting matte in an electric furnace. The matte produced in the flash smelting furnace and in the electric furnace are both directly conducted to further hydrometallurgical treatment. The method consists of drying, flash smelting, slag cleaning, and sulfurizing in one or two electric furnace(s) and gas cleaning for all the process step. This method requires much energy for drying, much technical oxygen for smelting and much energy for producing technical oxygen and oil or other fuel for smelting. This method requires also coke or other reductant for slag cleaning. The use of organic fuel and reductants in this process produces significant amounts of $CO_2$ emissions. This process produces two different types of matte: matte from smelting and matte from reduction. This means, that also two different leaching processes are required. Use of fuels increases the amount of gas flow and the big gas flow requires big boiler and gas line. Further, the smelting step requires high temperatures and furnace walls much cooling water.

BRIEF DESCRIPTION OF THE INVENTION

An object of the present invention is thus to provide a process so as to alleviate the above disadvantages. The objects of the invention are achieved by a process which is characterized by what is stated in the independent claims. The preferred embodiments of the invention are disclosed in the dependent claims.

The invention is based on the realization that it is possible to produce a single type of matte and a more economical step up when a process of the present invention is employed.

It is an advantage of the process of the present invention that it is possible to feed concentrate into the process without drying. If a small part of the concentrate fed directly to the smelting step only a small dryer is needed. Resultantly no steam and/or fuel and nitrogen or only small amount of steam and nitrogen is needed for drying.

Further with the process of the present invention that no flash smelting furnace is needed although a concentrate comprising significant amounts of MgO and other oxide material is employed. Thus no technical oxygen is needed for oxygen enrichment and no water heating in cooling staves is required. Additionally, no concentrate burner is needed as concentrate dries and reacts quickly up to target level.

BRIEF DESCRIPTION OF THE DRAWINGS

In the following the invention will be described in greater detail by means of preferred embodiments with reference to the attached [accompanying] drawings, in which.

DETAILED DESCRIPTION OF THE INVENTION

Figure 1:
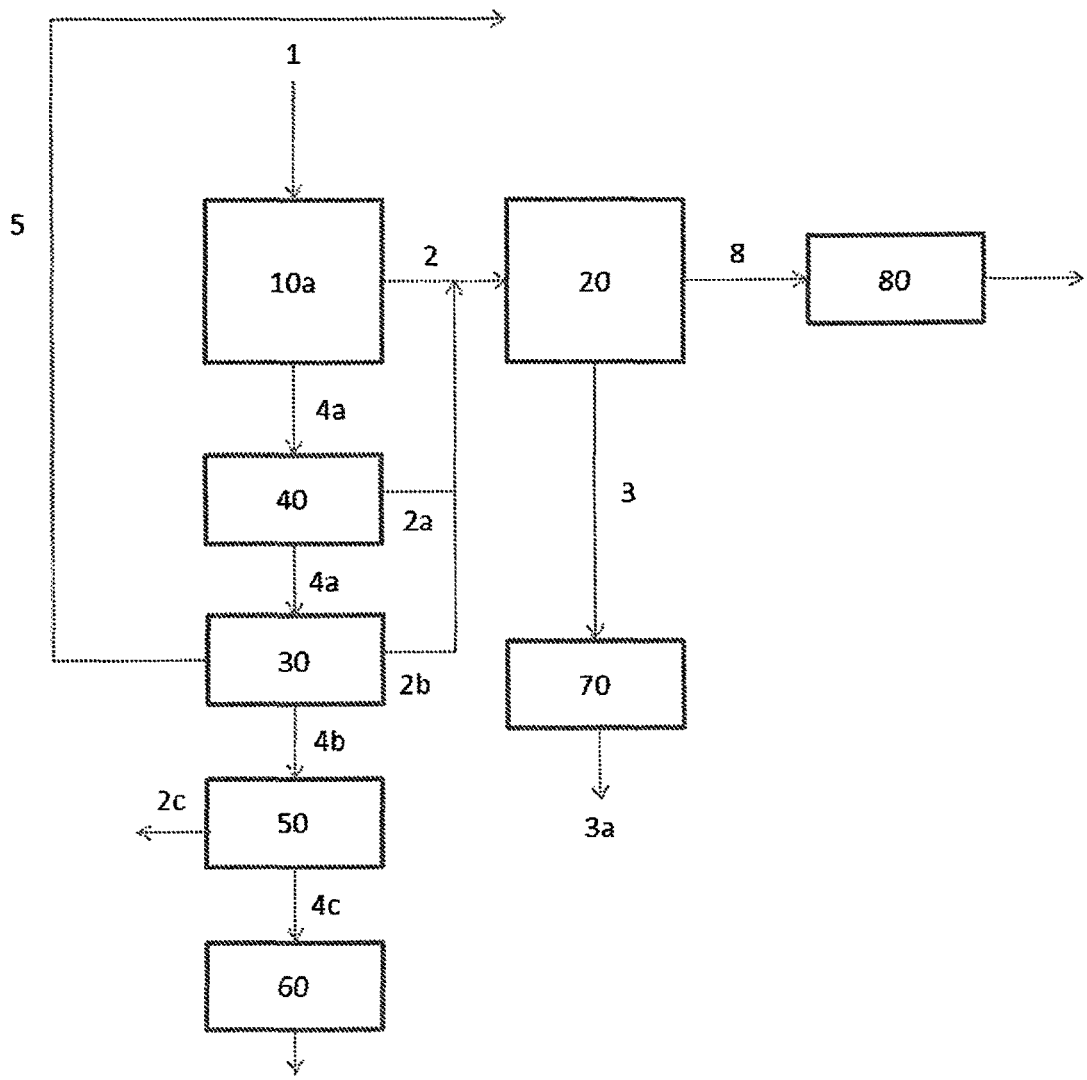
FIG. 1 shows a flow diagram of the process of the present invention illustrating a first embodiment of the invention.

The present invention provides a process of treating complex sulfide concentrate, comprising the steps of (a) roasting a wet or slurried complex sulfide concentrate in a furnace at a temperature of at least 720° C. to obtain a calcine; and (b) smelting the calcine obtained in step (a) under inert or oxygen free atmosphere in a smelting furnace to obtain a matte.

The process typically further comprises the step of (c) granulating the matte obtained in step (b) to obtain a granulated matte.

The process of the present invention is particularly suitable for complex sulfide concentrate comprising Ni, Cu, Co, Fe and/or PGM (platinum group metal(s)). The process of the present invention allows treatment of small deposits as well as complex sulfide ores and/or concentrates which comprise sulfides of several, at least two, metals. For example such complex sulfide concentrate can be obtained from complex sulfide ore comprising 2 to 20 wt % Ni, 0 to 15 wt % Cu, and 10 to 55 wt % Fe of the total weight of the concentrate. The concentrate typically also comprises smaller amounts other metals. Thus the term "complex sulfide concentrate" as used herein preferably refers to concentrates obtained from complex sulfide ores comprising sulfides of two or more, preferably three or more, metals.

In accordance with the process of the present invention all of the complex sulfide concentrate can be fed into the roasting step (a). Alternatively a first part of the complex sulfide concentrate is introduced into roasting step (a) and a remaining second part is introduced into smelting step (b) after drying. Typically in such case the first part is 80 to 90% of the total amount of the treated complex sulfide concentrate.

Roasting may be carried out in a drum furnace or in a fluidizing bed furnace. The fluidizing bed roasting can be accomplished either in a bubbling bed or a circulating bed. Circulating bed is possible in case where mainly iron has to be oxidized.

The desired outcome of roasting step (a) is dependent on the local oxygen pressure and temperature.

The temperature of the roasting step (a) should be at least 720° C. as sulfates are not wanted in the product and for example iron, copper and nickel form sulfates at temperatures below 700° C. The highest possible roasting temperature is depended on the composition of the concentrate as sintering of calcine or bed caused by ensuing melting is not desired. Advantageously the roasting temperature in step (a) is from 720 to 870° C., more preferably from 750 to 850, most preferably from 780 to 820° C. In temperatures above 870° C. the complex sulfide concentrates tend to produce molten phases.

Oxygen can be introduced into the roasting step (a) for example as oxygen enriched air, or any oxygen containing gas, preferably as oxygen enriched air. The required amount of oxygen in the roasting step (a) depends on the quality of the complex sulfide concentrate and the desired sulfide concentration of obtained calcine. Roasting is preferably carried out using such roasting conditions (oxygen pressure and temperature) that sulfates are not forming. The oxygen partial pressure is dependent of the wanted matte quality and is typically below 1000 Pa.

The sulfur content of the calcine is advantageously controlled. With the process of the present invention is possible to obtain calcine having sulfur content below 10% w/w. Depending of the sulfur content of the calcine, the quality of the produced matte is adjusted during roasting and/or smelting.

If quality of the matte is adjusted in the roasting step (a) oxygen coefficient is kept such that sulfur content of calcine will be such that smelted calcine with flux will produce in the smelting step (b) desired matte for leaching. For controlling, but not for completely removing, the sulfur content of the calcine it is possible to increase the temperature of the upper part of the furnace and the cyclone employed for treating the off gas obtained from the roasting step (b) by using secondary air for oxidation the sulfur of the dust. The sulfur content of the calcine will thus be controlled, but it will not be completely removed. This offers possibility to minimize retention time. The complete removal of sulfur would need longer retention time. In accordance with the present invention the sulfur content of the calcine may preferably be up to 10% w/w depending on the process type.

If quality of the matte is adjusted during smelting then dried complex sulfide concentrate is fed into the smelting step (b). The dried complex sulfide concentrate can be fed into the smelting furnace thorough a hollow electrode or using injection.

The off gas resulting from the roasting step (a) is typically led into heat recovery boiler which removes heat and produces steam. Steam can be then used from drying, leaching and other processes. Calcine dusts are typically removed from the off gas in boiler, cyclone(s) and/or electric precipitator(s). Cleaned off gas can be led to an acid plant.

When circulating bed roasting cyclone is utilized it is located before the waste heat boiler. Recovered calcine from the cyclone and the boiler can be directly introduced to smelting step (b) as due to optimized oxygen coefficient the calcine dust does not contain sulfates.

Calcine obtained from step (a) can be directly led into a smelting furnace in smelting step (b) as hot from the roasting furnace. When calcine is lead to smelting step (b) as hot, melting is quick and effective. It is typically led through a lined pipe, where it may be heated or kept as hot using off-gas of the smelting furnace, to a rotating feeding ring and onward to the smelting furnace, or using feeding pipe, where it may be heated or kept as hot using off-gas of the smelting furnace, to the smelting furnace.

Smelting in step (b) can be carried out as batches or continuously. Dry complex sulfide concentrate is mixed with the calcine obtained from step (a) and feed to the smelting furnace or calcine is fed like it was described earlier and the dried complex sulfide concentrate is injected or fed through hollow electrodes.

Smelting is preferably carried out with an electric furnace as the smelting furnace. The electric furnace may be resistance heated with Soder-berg electrodes or a DC furnace.

The gas atmosphere in smelting step (b) is inert, i.e. oxygen free. The gas flow is typically very low and therefore the amount of dust in minimized.

The temperature of the smelting step (b) is typically from 1250 to 1500° C., preferably from 1300 to 1450° C. Optimal temperature offers possibility to optimize energy requirement and recovery of valuable metals to matte.

The off gas resulting from smelting step (b) is preferably used for heating of calcine before cooling by either direct or indirect cooling and cleaned by scrubbing or with a bag filter.

Matte produced in the smelting furnace during the smelting step (b) is preferably granulated thereafter, because fine granule is possible to leach without milling.

Dusts of granulation gas can be removed by a cyclone. From the cyclone the gases can be led to a multi venture scrubber for removing sulfur dioxide and other impurities using e.g. a sodium hydroxide solution.

With the process of the present invention matte is separated from the slag very clearly. Further, the slag obtained by the process of the present invention contains no or very little copper sulfide, which could disturb the slag inertity.

FIG. 1 illustrates as a first example of the process of the present invention process flows of processes where all complex sulfide concentrate (1) is fed as wet or as slurry to a fluidizing bed furnace (10a) having a circulating bed for accomplishing roasting step (a). In the process shown in FIG. 1 the matte quality is adjusted in the fluidized bed furnace i.e. oxygen coefficient is kept as such that sulfur content of the resulting calcine (2) will be such that smelted calcine with flux will produce in the electric furnace (20) desired matte (3) for leaching.

As shown in FIGS. 2 to 5 as further examples of the invention, Part of the treated complex sulfide concentrate can be fed directly to smelting step (b) without roasting, provided that the directly fed part of the complex sulfide concentrate is first dried. In FIGS. 2 to 5, like components are designated by the same reference numerals as used in FIG. 1.

As presented in FIGS. 2 to 5 as second to fifth examples of the process of the present invention, a first part (e.g. 80%) (1a) of the complex sulfide concentrate is fed as wet or as slurry to a fluidizing bed furnace (10b) having a bubbling bed for accomplishing roasting step (a).

As illustrated in each of the FIGS. 1 to 5 the calcine (2) obtained in the roasting furnace (10a or 10b) is led for smelting into a smelting furnace (20) directly from the roasting furnace (10) through a lined pipe or a rotating feeding ring to obtain a matte (3). In all of the examples of FIGS. 1 to 5 an electric furnace is utilized as the smelting furnace. In the processes shown in FIGS. 2 to 5 the matte quality is adjusted during smelting and a second part (1b) of the complex sulfide concentrate (e.g. 20%) is fed after drying in a dryer (15) into the electric furnace (20) through a hollow electrode or using injection.

Further referring to the FIGS. 1 to 5 the off-gas (4a) from the roasting is led into heat recovery boiler (30), which removes calcine dust and heat and produces steam (5). Steam (5) is used for drying, leaching and/or other processes. Calcine dusts (2a, 2b, 2c) are removed from the cooled off gas (4b) in cyclone(s) (40) and electric precipitator(s) (50). Cleaned gas (4c) is led to an acid plant (60).

As shown in FIGS. 2 to 5, the cyclone (40) is typically located after the waste heat boiler (30). However, referring to FIG. 1, the cyclone (40) is located after the roasting furnace (10) and before the waste heat boiler (30) when the utilized roasting furnace (10) has a circulating bed.

Figure 2:
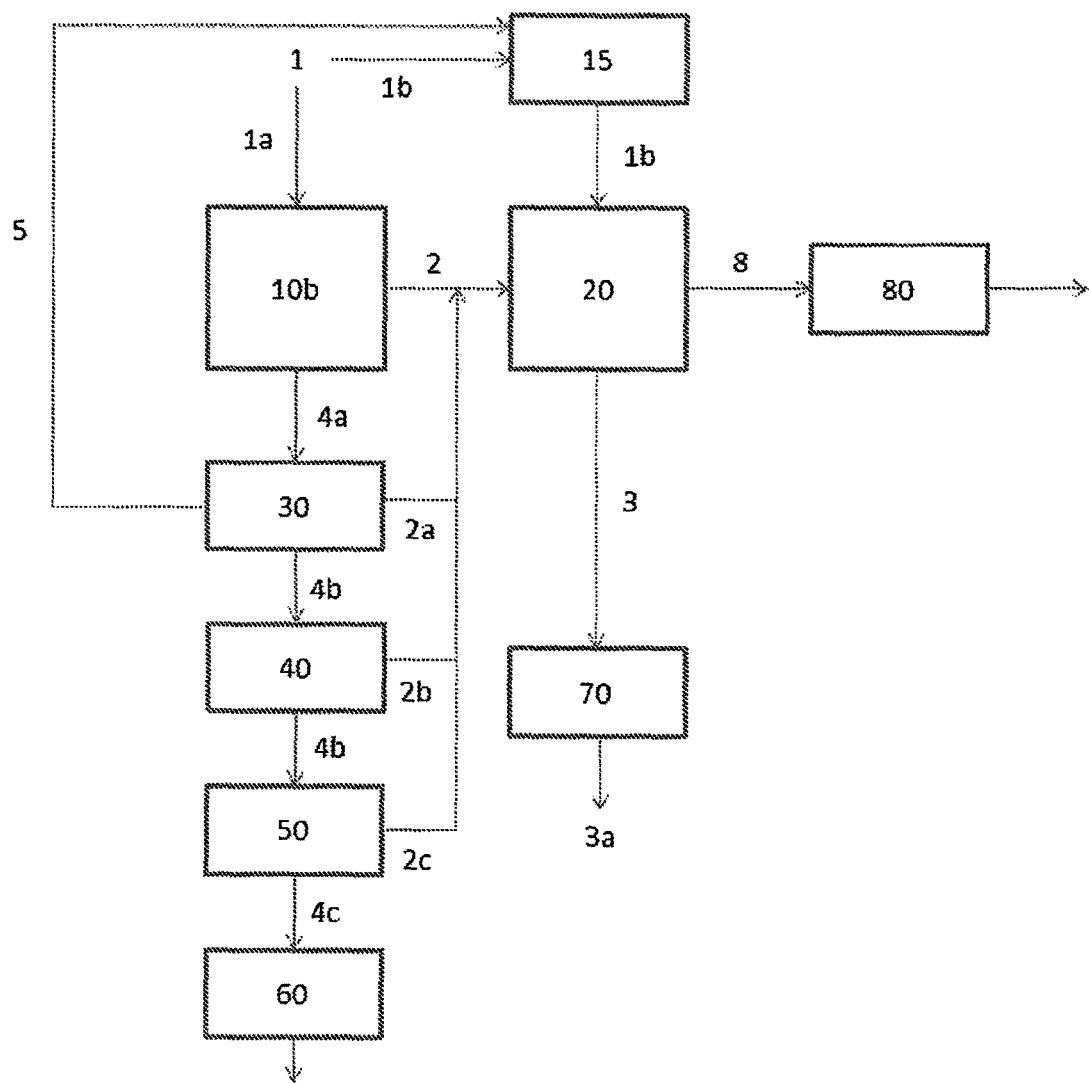
FIG. 2 shows a flow diagram of the process of the present invention illustrating a second embodiment of the invention.
Figure 3:
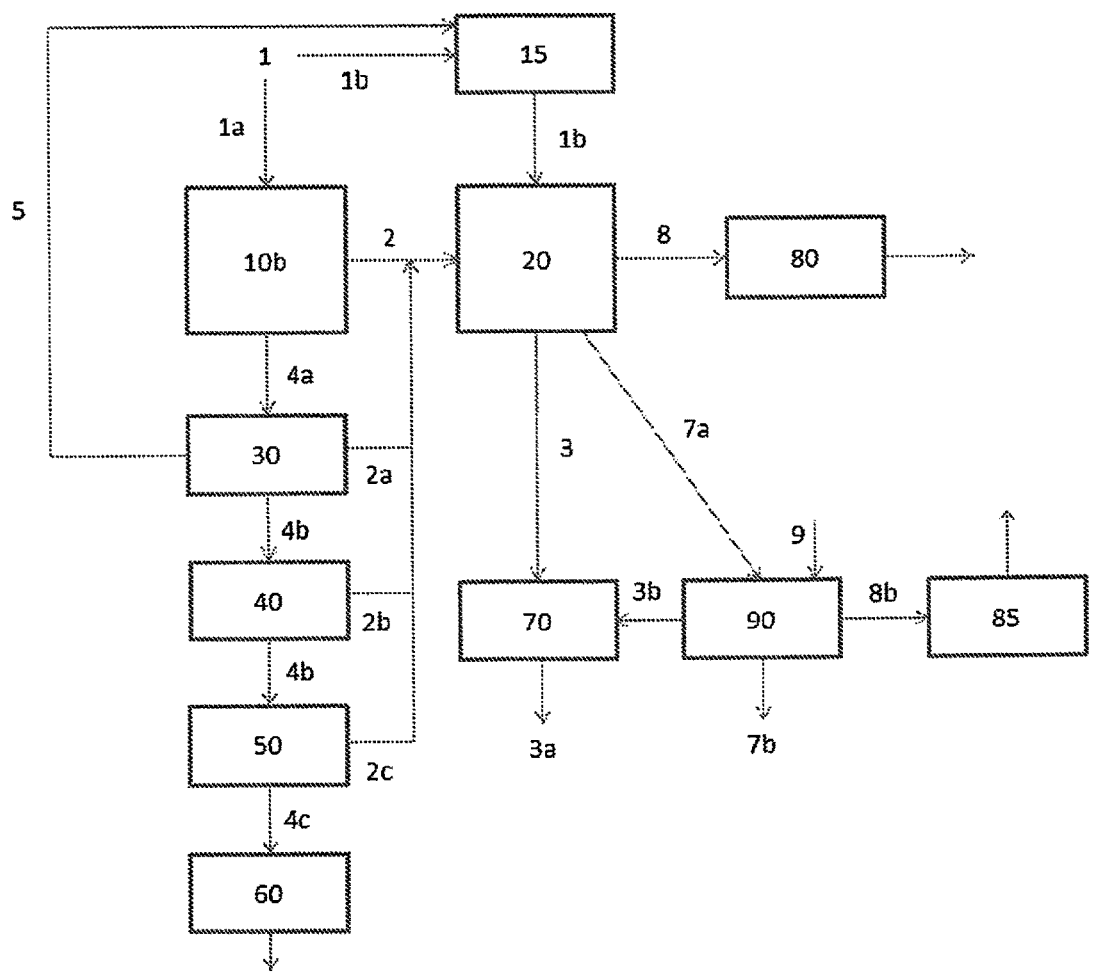
FIG. 3 shows a flow diagram of the process of the present invention illustrating a third embodiment of the invention.
Figure 4:
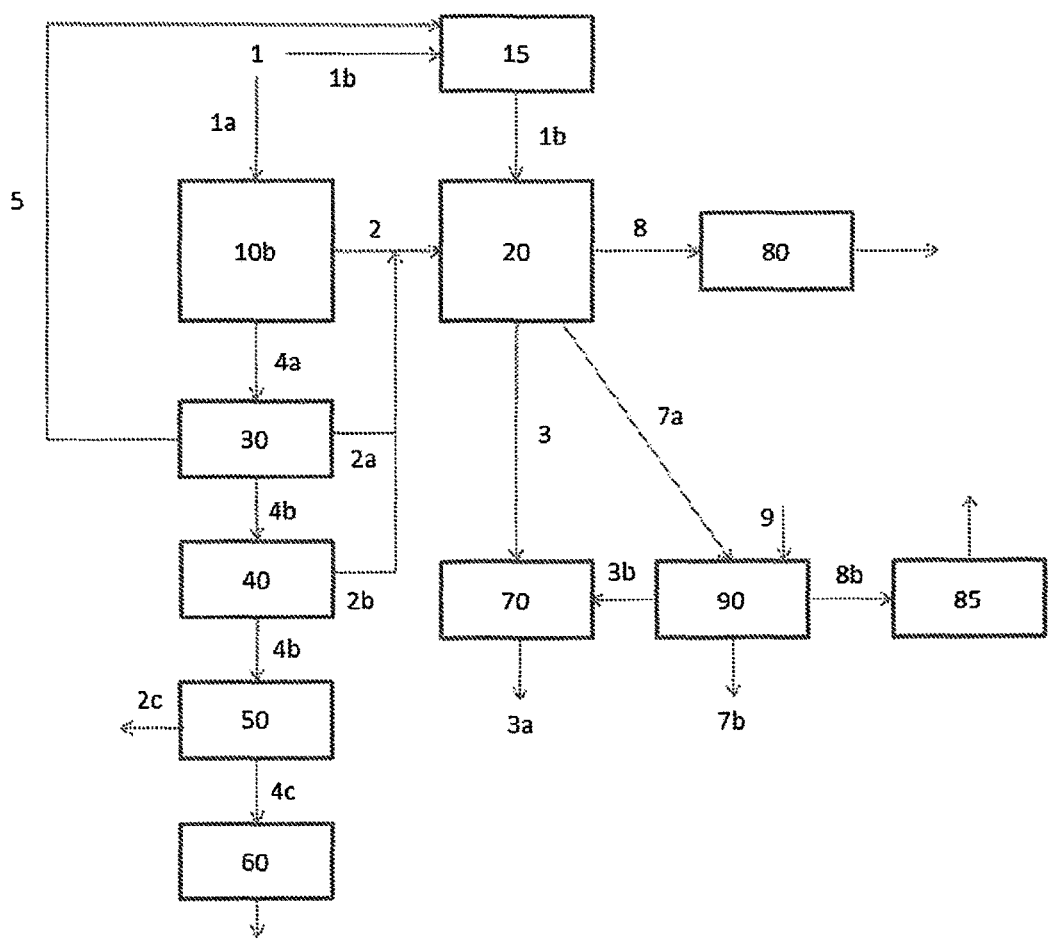
FIG. 4 shows a flow diagram of the process of the present invention illustrating a fourth embodiment of the invention.
Figure 5:
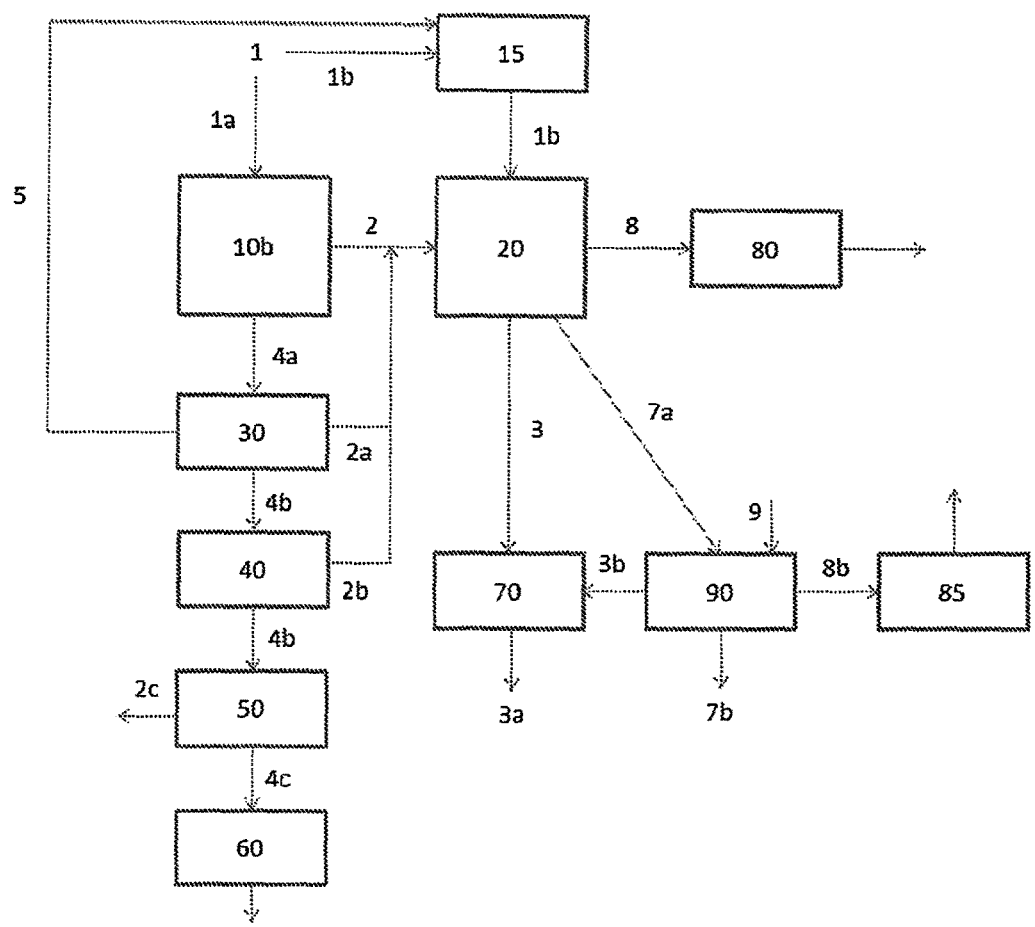
FIG. 5 shows a flow diagram of the process of the present invention illustrating a fifth embodiment of the invention.

Referring to FIGS. 1 to 5, calcine (2a and 2b, respectively) recovered from the waste heat boiler (30) and the cyclone (40) goes directly to the electric furnace (20) for smelting. As the oxygen coefficient is optimized in the roasting these dust calcine does not contain sulfates. As illustrated in FIGS. 2 and 3 also the calcine (2c) recovered from the electric precipitator (50) can be lead to the electric furnace (20) for smelting. However, as shown in FIGS. 1, 4 and 5, in some cases the dust amount of the electric precipitator (50) is low and/or it contain impurities and therefore it can be removed from circulating.

As shown in each of the FIGS. 1 to 5 the matte (3) obtained from the electric furnace (20) is typically granulated in granulation (70) and the granulated matte (3a) is fed to a subsequent leaching process.

As illustrated in each of the FIGS. 1 to 5, the gas (8) from the electric furnace (20) is cooled and cleaned by using scrubbing or bag filter (80).

As further illustrated in FIGS. 3 and 4, it is also possible to lead the slag (7a) obtained from the electric furnace (15) to a slag cleaning furnace (90), where the slag may be reduced in the presence of coke (9) to obtain an inert slag (7b) and further matte (3b). The further matte (3b) can then also be led to granulation (70). The gas (8b) from the slag cleaning furnace (90) is cooled and cleaned by using scrubbing or bag filter (85).

It will be obvious to a person skilled in the art that, as the technology advances, the inventive concept can be implemented in various ways. The invention and its embodiments are not limited to the examples described herein but may vary within the scope of the claims.

EXAMPLES

Example 1

Complex sulfide concentrate: Cu 9%, Ni 2.3%, Co 0.1% and PGM 10 g/t, FeS 46% and gangue 54% was treated in laboratory scale using method of the present invention to produce the following slag and matte:

|  | Matte | Slag |
|---|---|---|
| Cu | 58.9% | 1.06% |
| Ni | 13.4% | 0.76% |
| Fe | 5.8% | 31.4% |
| S | 20.4% | 0.13% |

|  | Matte | Slag |
|---|---|---|
| Co |  | 0.07% |
| $SiO_2$ |  | 31.6% |
| Mg |  | 4.3% |
| Al |  | 5.0% |
| Na |  | 0.96% |
| K |  | 0.20% |

Perceptibly noticeable is that matte separated from the slag very clearly in these laboratory experiments. The sulfur content of the slag was very low. This means, that slag does not contain copper sulfide, which could disturb the slag inertity. This matte was mainly copper sulfide, nickel sulfide and nickel-iron sulfide. Matte contained a little amount of metallic copper, but no metallic iron.

The invention claimed is:

1. A process of treating complex sulfide concentrate, wherein the complex sulfide ore comprises 2 to 20 wt % Ni, 0 to 15 wt % Cu, and 10 to 55 wt % Fe of the total weight of the concentrate and the complex sulfide concentrate is obtained from complex sulfide ores comprising sulfides of two or more metals, comprising the steps of:
   (a) roasting wet or slurried complex sulfide concentrate in a furnace at a temperature from 720° C. to 870° C. to obtain a calcine, wherein oxygen is introduced into the roasting step (a) as oxygen enriched air, wherein the oxygen partial pressure is below 1000 Pa; and
   (b) smelting the calcine obtained in step (a) at a temperature from 1250° C. to 1500° C. under inert or oxygen free atmosphere in a smelting furnace to obtain a matte.

2. The process as claimed in claim 1, further comprising:
   (c) granulating the matte obtained in step (b) to obtain a granulated matte.

3. The process as claimed in claim 1, wherein the complex sulfide concentrate comprises Ni, Cu, Co, Fe and/or PGM.

4. The process as claimed in claim 1, wherein the calcine has sulfur content below 10% w/w.

5. The process as claimed in claim 1, wherein the furnace in step (a) is a drum furnace or a fluidizing bed furnace.

6. The process as claimed in claim 1, wherein the roasting temperature in step (a) is from 780 to 820° C.

7. The process as claimed in claim 1, wherein roasting in step (a) is accomplished in a bubbling bed.

8. The process as claimed in claim 1, wherein the smelting temperature in step (b) is from 1300 to 1450° C.

9. The process as claimed in claim 1, wherein a first part of the complex sulfide concentrate is introduced into the roasting step (a) and a remaining second part is introduced into the smelting step (b) after drying.

10. The process as claimed in claim 1, wherein the smelting furnace is an electric furnace.

11. The process as claimed in claim 1, wherein the roasting temperature in step (a) is from 750 to 850° C.

* * * * *